(12) United States Patent
Bahl et al.

(10) Patent No.: US 11,073,465 B2
(45) Date of Patent: Jul. 27, 2021

(54) REAL-TIME SENSING OF FLOWING NANOPARTICLES WITH ELECTRO-OPTO-MECHANICS

(71) Applicant: The Board of Trustees of the University of Illinois, Urbana, IL (US)

(72) Inventors: Gaurav Bahl, Champaign, IL (US); Jeewon Suh, Savoy, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 35 days.

(21) Appl. No.: 16/107,478

(22) Filed: Aug. 21, 2018

(65) Prior Publication Data

US 2019/0056303 A1 Feb. 21, 2019

Related U.S. Application Data

(60) Provisional application No. 62/548,051, filed on Aug. 21, 2017.

(51) Int. Cl.
*G01N 15/14* (2006.01)

(52) U.S. Cl.
CPC ..... *G01N 15/1404* (2013.01); *G01N 15/1459* (2013.01); *G01N 2015/142* (2013.01); *G01N 2015/1477* (2013.01)

(58) Field of Classification Search
CPC ........... G01N 15/1404; G01N 15/1459; G01N 2015/142; G01N 2015/147
See application file for complete search history.

(56) References Cited

U.S. PATENT DOCUMENTS

| 2003/0000291 A1* | 1/2003 | Kolosov | G01N 9/32 73/61.52 |
| 2009/0245714 A1* | 10/2009 | Bratkovski | G02B 6/12007 385/2 |
| 2010/0000325 A1* | 1/2010 | Kaduchak | G01N 15/1459 73/570.5 |

(Continued)

OTHER PUBLICATIONS

"Brillouin cavity optomechanics with microfluidic devices", Nat Commun 4, 1994 (2013) doi: 10.1038/ncomms2994 by Gaurav Bahl. (Year: 1994).*

(Continued)

*Primary Examiner* — Jamil Ahmed
(74) *Attorney, Agent, or Firm* — Benesch, Friedlander, Coplan & Aronoff LLP

(57) ABSTRACT

A system and method include a resonator device including walls forming a channel, where the walls are shaped to simultaneously confine light in an optical mode and to confine vibration in a mechanical mode, and where the mechanical mode is selected so that vibration in the mechanical mode can couple to the optical mode. A waveguide is coupled with the resonator device for guiding a probe light through the resonator device. An electro-mechanical actuation mechanism provides a mechanical drive force to the resonator device. A photodetector measure light outputted by the waveguide after passing through the resonator device, the outputted light including a modulated version of the probe light based on passing through the resonator device and interacting with a fluid, or a fluid containing a particle, contained by the channel of the resonator device.

15 Claims, 4 Drawing Sheets

(56) References Cited

U.S. PATENT DOCUMENTS

| | | | |
|---|---|---|---|
| 2010/0041166 A1* | 2/2010 | Arie | G01N 21/6428 |
| | | | 436/501 |
| 2010/0139377 A1* | 6/2010 | Huang | G01N 15/1404 |
| | | | 73/61.75 |
| 2013/0259072 A1* | 10/2013 | Maleki | H01S 3/1305 |
| | | | 372/20 |
| 2016/0116366 A1* | 4/2016 | Da Silva | G01L 1/167 |
| | | | 702/35 |
| 2016/0209594 A1* | 7/2016 | Bahl | G02F 1/365 |

OTHER PUBLICATIONS

"High-throughput sensing of freely flowing particles with optomechanofluidics", Optica vol. 3, Issue 6, pp. 585-591 (2016) (https://doi.org/10.1364/OPTICA.3.000585) by Gaurav Bahl et al. (Year: 2016).*

Bahl, G. et al., "Brillouin cavity optomechanics with microfluidic devices," Nature Communications, 4:1994, 2013 (6 pages).

Han, K. et al., "Fabrication and Testing of Microfluidic Optomechanical Oscillators," Journal of Visualized Experiments, 87, e51497, May 2014 (8 pages).

Han, K. et al., "High-throughput sensing of freely flowing particles with optomechanofluidics," Optica, vol. 3, No. 6, Jun. 2016, pp. 585-591 (7 pages).

* cited by examiner

REAL-TIME SENSING OF FLOWING NANOPARTICLES WITH ELECTRO-OPTO-MECHANICS

CROSS-REFERENCE TO RELATED APPLICATION

This application claims the benefit of U.S. Provisional Application Ser. No. 62/548,051, filed Aug. 21, 2017, which is incorporated in its entirety herein.

STATEMENT REGARDING FEDERALLY SPONSORED RESEARCH OR DEVELOPMENT

This invention was made with government support under ECCS1408539 and ECCS1509391 awarded by the National Science Foundation. The government has certain rights in the invention.

BACKGROUND

Opto-mechano-fluidic resonators (OMFRs) are a unique optofluidics platform that can measure the mechanical properties of fluids and particles in a fully-contained microfluidic system. By confining light in optical whispering gallery modes of OMFRs, light can be used to sense structural vibrations in mechanical modes spanning MHz to GHz frequencies. These vibrations are hybrid fluid-shell modes that are affected by any analyte present inside, and may also be intentionally driven at a chosen frequency. As a result, the light that couples to such a mechanical mode can carry information on the mechanical properties of the analytes, in parallel with more traditional optical property measurements with existing optofluidics techniques.

BRIEF DESCRIPTION OF THE DRAWINGS

The features, objects and advantages other than those set forth above will become more readily apparent when consideration is given to the detailed description below. Such detailed description makes reference to the following drawings, wherein.

Figure 1:
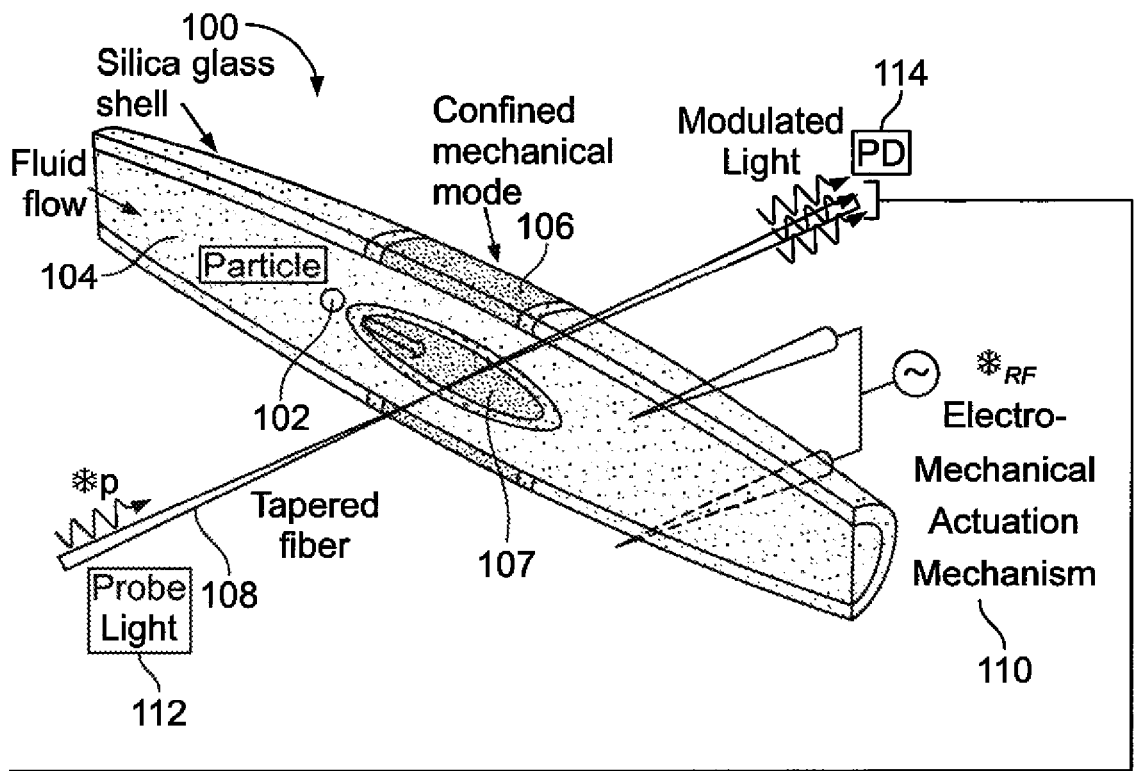
FIG. 1 is a schematic of an example detection device for detecting particles.
Figure 1:
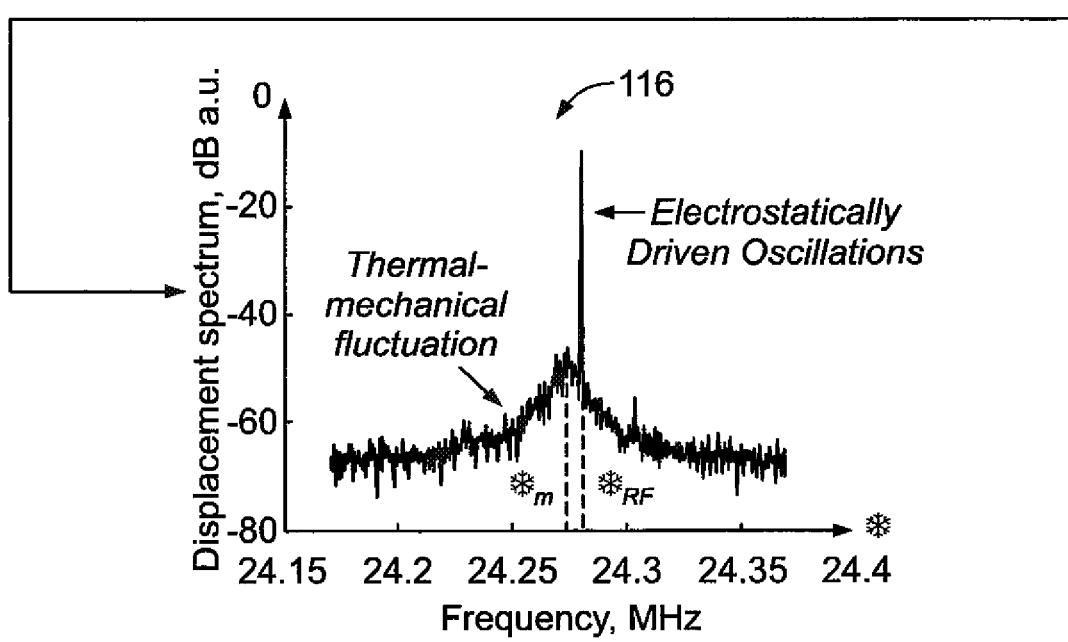

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The device and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the device and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Resonant optical sensors devices can enable sensitive label-free detection of single micro-particles and nanoparticles in fluid samples. These sensors generally rely on the random diffusion and adsorption of particles within the sensing volume of the device, which may only enable quantification of a small fraction of the total analyte sample. Furthermore, mechanical properties of the analyte particles such as density, viscosity, and elastic modulus, which do not couple directly to optical fields, cannot be quantified by these techniques. The utilization of optomechanical coupling may allow both long-range sensing of particles using phonons without needing adsorption near the optical mode, as well as the extraction of the particle mechanical parameters, using only optical measurements. The optomechanical technique can be implemented using opto-mechano-fluidic resonators (OMFRs) which can include a hollow fused silica microcapillary and support coupled optical and mechanical modes. The optomechanical coupling between these modes of OMFRs has been previously used to develop sensors for the density and viscosity of fluid samples. Recently, breathing mechanical modes of OMFRs (e.g., radially symmetric modes in which both the solid and fluid fractions participate) have been shown to cast a nearly perfect phonon net that may also be used to quantify the mechanical properties of individual particles flowing through the OMFR microchannel without requiring adsorption. In some aspects, high quality factor optical resonators allow label-free detection of individual nanoparticles through perturbation of optical signatures but have practical limitations due to reliance on random diffusion to deliver particles to the sensing region.

FIG. 1 is a schematic of an example detection system 100, which can act as a sensor, to efficiently detect free-flowing particles 102 positioned in fluid 104 flowing through and/or contained in a resonator device 106 e.g., OMFR, without requiring labeling, binding, or direct access to the optical mode. In some examples, a property of particle includes at least one of stiffness, volume, compressibility, speed of sound, mass and density, and a property of the fluid comprises at least one of bulk modulus, speed of sound, density, viscosity and non-Newtonian parameters. The resonator device 106 includes walls which for a channel 107 to contain the fluid 104. The walls of the resonator device 106 are shaped to simultaneously confine light in an optical mode and to confine vibration in a mechanical mode. The mechanical mode is selected or designed so that vibration in the mechanical mode can change the properties of, e.g., couple to, the optical mode. In some examples, the resonator device 106 can be manufactured as a hollow fused silica microcapillary, for containing the particle 102 and the fluid 104. The system 100 can also include a waveguide 108, e.g., an optical fiber or waveguide, coupled with the resonator device 106, for passing light from a light source 112 through the resonator device 106.

The system 100 can also include an electro-mechanical actuation mechanism 110 for providing a mechanical drive force to the resonator device 106 using electrostatic force, which increases the amplitude of mechanical vibration. For example, the electro-mechanical actuation mechanism 110 produces mechanical vibration of the mechanical mode of the resonator device 106. In some examples, the electro-mechanical actuation mechanism 110 produce at least one of a dielectrophoretic mechanical drive force and an electrostatic mechanical drive force, e.g., when provided with an electrical stimulus. In some examples, the electro-mechanical actuation mechanism 110 includes electrodes, e.g., of an electrostatic drive. In some examples, the resonator device 106 is coated with conductive material and can operate as one of the electrodes. Example conductive materials include, but are not limited to, silver, gold, other metals, other conductive materials, etc. Other types of mechanical mechanisms/forces can be used. A photodetector (PD) 114, or other sensor, can measure the light outputted from the optical fiber waveguide 108. The outputted light is a modulated version of the inputted light based on passing through the resonator device 106 and interacting with the fluid 104 and/or particle 102 by the mechanical vibration. An electronic output signal from the photodetector 114 can be used as a sensor. The sensor can sense properties of particles contained within the channel 107 of the resonator device 106, without requiring labeling or binding of the particle, and with or without requiring direct interaction of the particle with an optical mode of the resonator device.

In some examples, rapid detection of single particles 102 can be achieved through the long-range optomechanical interaction of modification of the resonator mechanical modes during particle 102 transits influencing the scattered light spectra of the resonator device 106. In some examples, a hybrid electro-opto-mechanical technique can substantially increase the bandwidth of the detection method to enable real-time operation. Additionally, as described in more detail in FIG. 2, the detection system 100 can provide high bandwidth lock-in measurements of the optical modulation that is induced by actuating the mechanical mode electrostatically at a fixed frequency. In some examples, the detection system 100 demonstrates temporal resolution of better than 20 μs (50,000 events/s) with very high resolution, e.g., the particle size noise floor is low, down to nearly 490 nm, operating in the air without any stabilization or environmental control. In some examples, the detection system 100 can significantly enhance the sensing capabilities of optical resonators into the mechanics domain and allow extremely high-throughput analysis of large populations of particles.

Opto-mechano-fluidic detection is achieved on flowing particles passing through the resonator device 106, e.g., a micro-capillary resonator. The resonator device 106 simultaneously confines optical whispering gallery modes and breathing mechanical modes in the same physical region, resulting in strong optomechanical coupling. The optical fiber waveguide 108, which can be tapered, allows probing of the resonator optical modes. Forward scattered light in the fiber exhibits sidebands at the mechanical eigenfrequencies of the resonator due to the optomechanical coupling. The resulting optical intensity modulation is measured electronically via the photodetector 114 and incorporates the spectrum of the mechanical motion. A breathing mechanical mode of the resonator, e.g., radially symmetric extensional mode, can be employed due to its high sensitivity to particles deep inside the liquid core of the resonator device 106. The breathing mechanical mode, or other mechanical mode, can be engineered by design based on the geometric and material properties of the resonator device 106 and/or fluid. A shape and frequency of the breathing mechanical mode can be engineered by the designer. The mechanical mode can be driven by a single-tone electrostatic drive force at $\omega_{RF}$, e.g., by means of two 100 μm wire geometry electrodes. Frequency perturbations of the OMFR mechanical mode frequency $\omega_m$ caused by flowing particles are translated to amplitude perturbation of this tone in the output electronic spectrum, which can then be tracked via a lock-in amplifier 210.

The breathing mechanical modes of the detection system 100 can provide deep permeation into the liquid fraction of the resonator, which results in high sensitivity to transiting particles. During a transit, the mechanical eigenmode is perturbed due to the density and compressibility contrast of the particle relative to the carrier fluid. The change of the mechanical mode spectrum in response to this perturbation depends on the position, density, stiffness, and size of the particle 102. Since the perturbation modifies both potential and kinetic energy contributions from the fluid 104, it can lead to both a mass loading effect as well as a spring stiffening effect. Generally, the stiffening effect is dominant when the particle transits deep in the core of the fluid 104, resulting in increase of the mechanical eigenfrequency during the transit. Previous measurements in K. Han, J. Kim, and G. Bahl, Optica 3, 585 (2016) were performed by optically measuring the spectrum of the thermal-mechanical (e.g., "Brownian") fluctuations of the mechanical mode. However, since the vibrational noise signal is close to the noise floor of the measurement apparatus, the measurements require spectral analysis, averaging, and curve fitting of the photocurrent spectrum. The instrumentation limit of these measurements is set by the capabilities of the hardware with which spectra can be evaluated.

The fabrication of an example resonator device 106 has previously been described in G. Bahl, K. H. Kim, W. Lee, J. Liu, X. Fan, and T. Carmon, Nat. Commun. 4, 1994 (2013) and K. Han, K. H. Kim, J. Kim, W. Lee, J. Liu, X. Fan, T. Carmon, and G. Bahl, J. Visualized Exp. 87, e51497 (2014), which are incorporated by reference in their entirety herein. In some examples, microcapillary resonators are fabricated from fused silica capillaries (Polymicro Technologies TSP-700850) of 850 μm outer diameter that are adiabatically linearly drawn under laser heating used for softening the material. The diameter of a resonator device 106 can be locally varied by modulating the laser power during the drawing process. Microcapillaries having microbottle geometry with 60-70 μm outer diameter can be produced by this method and support simultaneous confinement of optical and mechanical modes in the regions of the highest diameter. Typical optical quality factors for the bottle mode whispering-gallery modes (WGMs) are around $10^7$, while the breathing mechanical mode quality factors are typically around $10^3$-$10^4$. Typical eigenfrequencies of the breathing mechanical vibrations of interest span 20-40 MHz. The 24 MHz mode used in this example has mechanical Q of 2700.

One end of the resonator device 106 can be connected to a pump, e.g., syringe pump, from which analyte solutions can be flowed through at a determined rate, e.g., 10 μl/min, 15 μl/min, and 50 μl/min. In some examples, the resonator device 106 can be vertically oriented during to prevent particles from settling due to gravity.

In the detection system 100, the optical WGMs can be frequency modulated by both thermal motion and driven excitations of the co-located mechanical modes due to the optomechanical coupling occurring within the resonator device 106. The spectrum of mechanical displacement can thus be measured by quantifying the light intensity modulation of a continuous wave (cw) laser source 112 evanescently coupled to the WGMs through the tapered optical fiber waveguide 108. This spectrum measurement is achievable using the photodetector (PD) 114 at the fiber output.

Referring also to the graph 116 in FIG. 1, the photodetector 114 can measure a displacement spectrum at different frequencies, e.g., to quantify thermal-mechanical fluctuation and electrostatically driven oscillations. Processing-intensive extraction of the entire vibrational spectrum is not necessary. Instead, the detection system 100 can quantify the mechanical transfer function at a single frequency. For example, the detection system 100 generates a large single tone drive force at frequency $\omega_{RF}$ through the electro-mechanical actuation mechanism 110 to drive the mechanical vibration via electrostatic actuation. Optical detection of the mechanical response to this applied force tone enables real-time measurements of the mechanical mode frequency fluctuations during particle 102 transit events. For the sake of explanation, a monodisperse solution of 3.62 μm silica microparticles is tested. In some examples, the detection system 100 can operate in the air without any environmental controls that has a measurement noise floor of 490 nm (particle diameter) and can sample transits as fast as 20 μs. As described in more detail below, the examples can provide a practical real-time flow cytometry analysis of the mechanical properties of individual particles 102.

Figure 2:
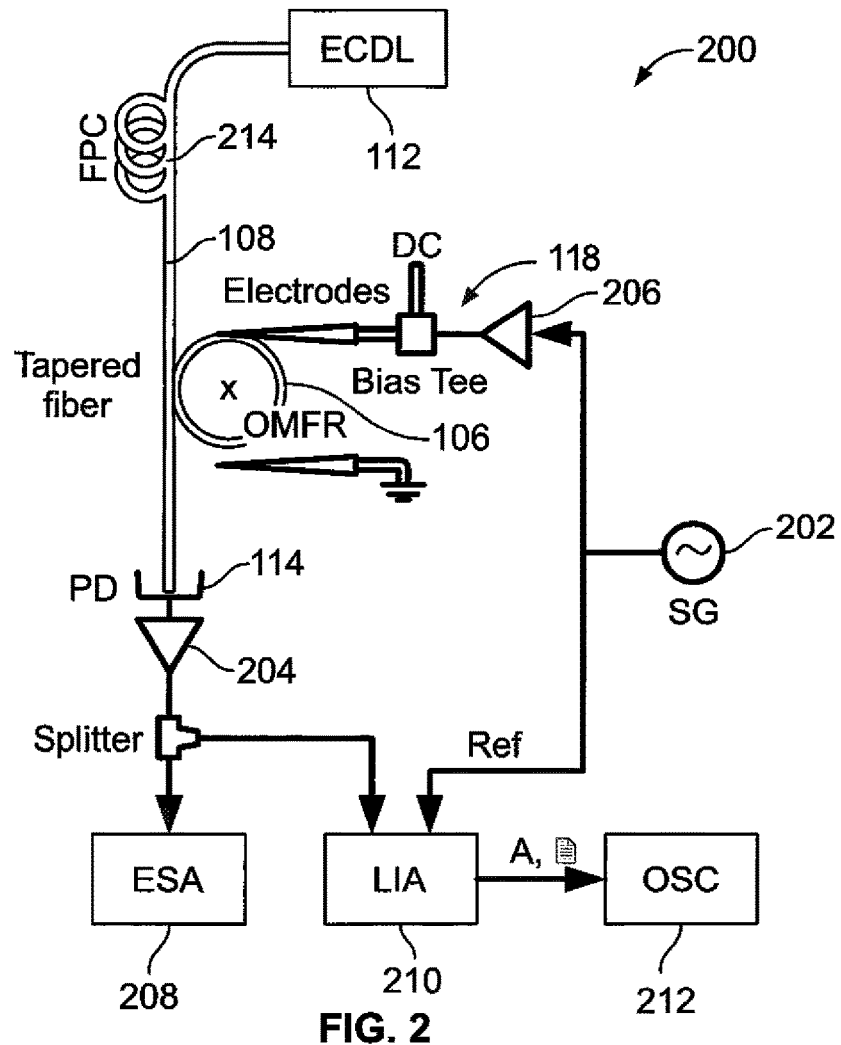
FIG. 2 is a schematic of an example measurement system.

FIG. 2 is a schematic of an example measurement system 200. In one example, an external-cavity diode laser (ECDL) light wave source 112 provides the probe light, e.g., at 1520-1570 nm, to observe the resonator's 106 optical high-Q optical WGMs through the tapered optical fiber 108. In some examples, a fiber polarization controller (FPC) 214 can connect the laser light source 112 to the fiber waveguide 108. The resonator device 106 can be placed in contact with the tapered fiber waveguide 108 to minimize fluctuations of the taper resonator coupling due to ambient vibration or by vibration induced due to fluid flow. An electronic spectrum analyzer (ESA) can be used as the photodetector 114 to monitor the mechanical vibrational spectrum via the detector photocurrent.

The fiber waveguide 108 can be put in contact with the resonator device 106 to stabilize the coupling against vibration and long-term coupler drift. A signal generator (SG) 202 can provide the RF stimulus at to the two electrodes of the electro-mechanical actuation mechanism 110. At least one of the two electrodes can be placed in contact with the resonator device 106 to ensure direct mechanical actuation using the electrostatic force. Mechanical actuation can also be achieved without contact if the dielectrophoretic force is used instead. A bias tee 118 can connect the DC voltage to power the electro-mechanical actuation mechanism 110, e.g., to enhance the electrostatic drive force of the electro-mechanical actuation mechanism 110. Amplifier 204 can improve an output electronic signal from the photodetector (PD) 114 and amplifier 206 can enhance the eletro-mechanical actuation signal. The amplifiers 204 and 206, can mitigate the influence of the RF electronic feedthrough signal. A forward photodetector 114 converts the optomechanically modulated light to an electronic signal, carrying information on the vibrational spectrum. The electronic signal can be received by the electrical spectrum analyzer (ESA) 208 and lock-in amplifier (LIA) 210, e.g., via a splitter which splits the signal sent by the photodetector 114. The lock-in amplifier 210 outputs amplitude A and phase θ based on the received signal, which can be displayed in real-time, e.g., using an oscilloscope (OSC) 212 or some other electronic measuring device. The lock-in amplifier 210 can receive an output signal from the photodetector 114 and to output an amplitude and phase based on a received output signal.

For an OMFR detection system 100 having a very high bandwidth, the measurement rate can be limited by the ESA 208. Typically ESAs may not have very high bandwidth and may limit the measurement speed. Quantification of the amplitude and frequency parameters of the mechanical vibration usually require post-processing of the measured spectra, and thus can be an innately slow measurement. To improve the signal-to-noise ratio, the detection system 100 includes the electro-mechanical actuation mechanism 110, which in some examples can include two 100 μm diameter electrodes placed on either side of the resonator device 106. A strong RF tone can be applied at $\omega_{RF}$ near the mechanical resonance via the signal generator (SG) 202. The frequency $\omega_{RF}$ can be selected such that the local amplitude response vs frequency has the highest slope, which in general can depend on the electronic feedthrough in the system 100. In some examples, one of the electrodes is placed in contact with the resonator device 106 to ensure direct mechanical actuation. The resulting mechanical excitation can be about 50-60 dB above the thermal Brownian motion of the mode. This mechanical signal generates optical sidebands that are detected as a beat note on the photodetector at frequency $\omega_{RF}$, e.g., as shown in the spectrum example in FIG. 1. The lock-in amplifier (LIA) 210, e.g., a Stanford Research Systems model SR844, can be used to compare the output from the photodetector 114 to the output from the signal generator 202 in order to monitor in real-time, e.g., using the oscilloscope 212 or other high-speed voltage measuring device, the transfer function, e.g., both amplitude and phase, from the RF signal input to the optical modulation on the photodetector at the frequency $\omega_{RF}$. Frequency shifts $\Delta\omega_m$ in the mechanical mode result in both amplitude and phase perturbations of this transfer function, with bandwidth only subject to the lock-in time constant. Measurements of amplitude response are used to characterize perturbations of the mechanical mode. Changes in amplitude are converted to changes in the eigenfrequency of the mechanical mode through a calibration that can be performed at the beginning and end of each example.

In some examples, we use an OMFR with 70 μm outer diameter, 50 μm inner diameter, and perform measurements using a 24.26 MHz mechanical mode. The analyte solution includes monodisperse 3.62+/−0.09 μm silica particles (Co-spheric SiOMS-1.8 3.62 μm) mixed in water. The particles can be significantly diluted to ensure transits that are clearly separated in time.

Figure 3A:
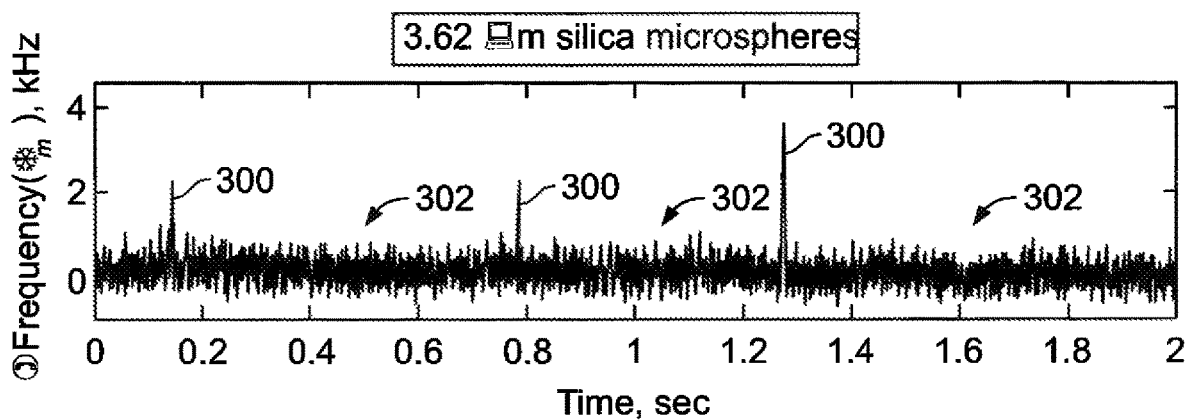
FIGS. 3A-B are graphs of example real-time measurements of particle transits.
Figure 3B:
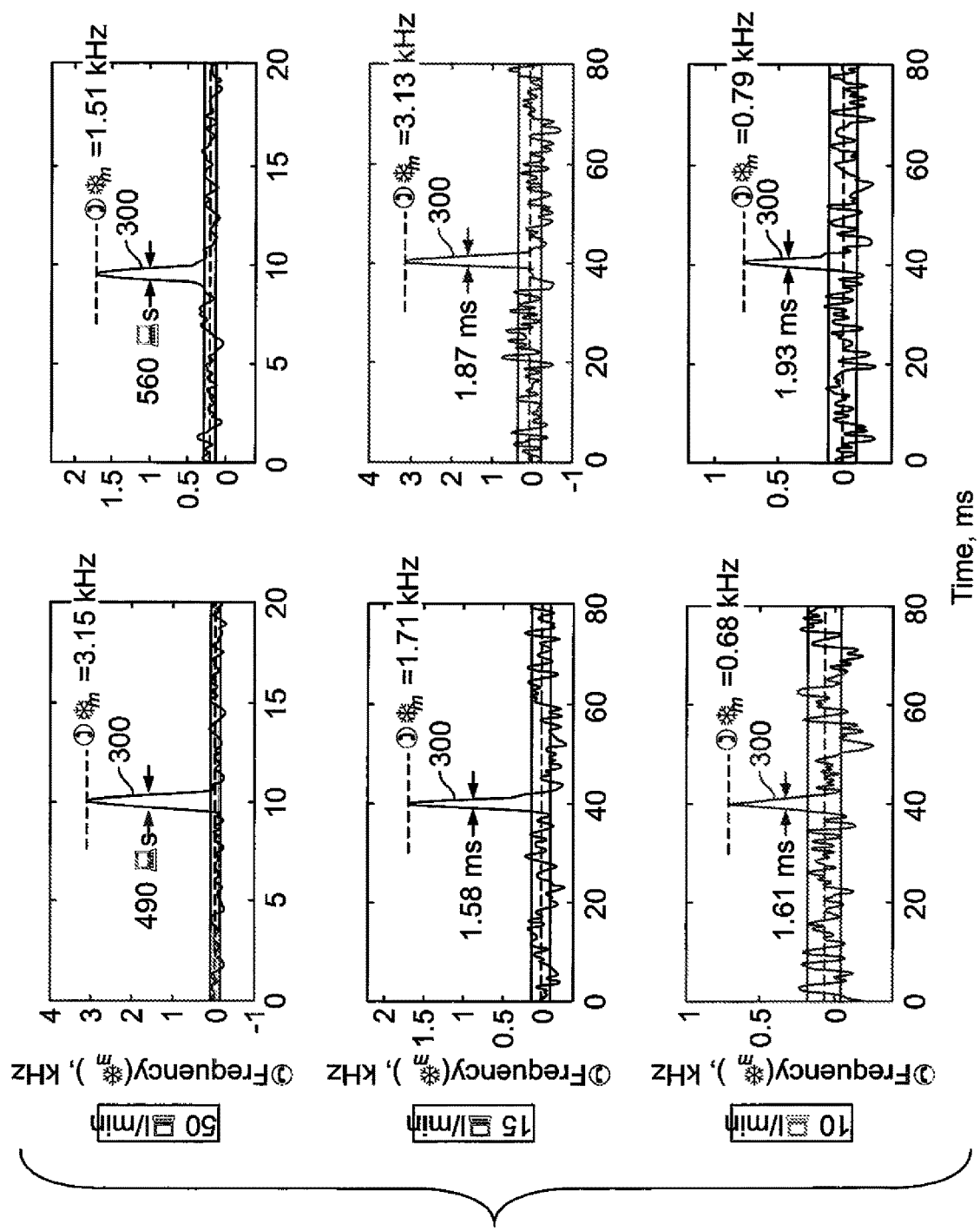

FIGS. 3A-B are graphs of example real-time measurements of particle 102 transits. In FIG. 3A, successive transits of 3.62 μm silica particles 102 stand out as an observable spikes 300 in the graphs, above the background frequency noise 302. In FIG. 3B, zoomed views of various transits are measured at example 10 μl/min, 15 μl/min, and 50 μl/min flow rate. The zoomed in views show detail and the high rate of measurement. Each measurement quantifies the magnitude of frequency shift and the transit speed of the particle 102. The transit time can be determined as the full-width at the average frequency shift between the local peak and the local background average. The shaded area in each data set represents the mean and +/−1 standard deviation.

In FIG. 3A, the frequency shifts of the mechanical mode associated with individual particle transits can be clearly observed above the background noise fluctuation in real-time, without needing any post-processing. These observations are made using the same resonator device 106 and the same mechanical mode, allowing an estimation of transit speed and the frequency perturbation caused by each individual particle 102. The frequency shift associated with each transit is different even though the particles are nominally monodisperse. This variation occurs as a function of the local properties of the mechanical mode where the transit occurs. Additionally, background noise levels between all the presented transits in FIG. 3B are similar and only appear different due to the different vertical scaling of each figure. Using this technique, the system 100 can detect particle transits with time scales as short as 490 µs, which is presently only limited by the achieved syringe pump flow rate. This time scale corresponds to a measurement throughput exceeding 1000 particles/s, which is about 40× faster than previous known systems.

Figure 4A:
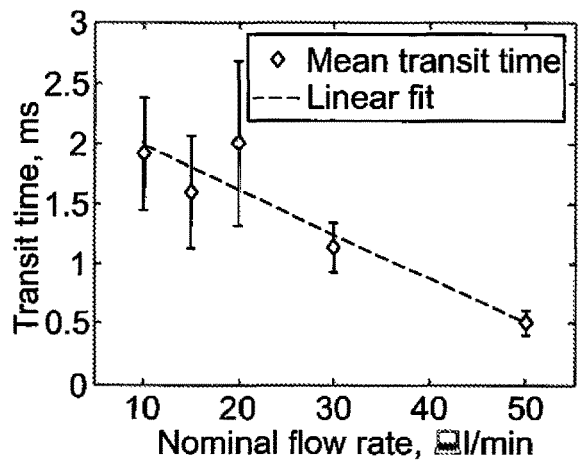
FIGS. 4A-B are graphs of example analysis of transit time and frequency shift statistics.
Figure 4B:
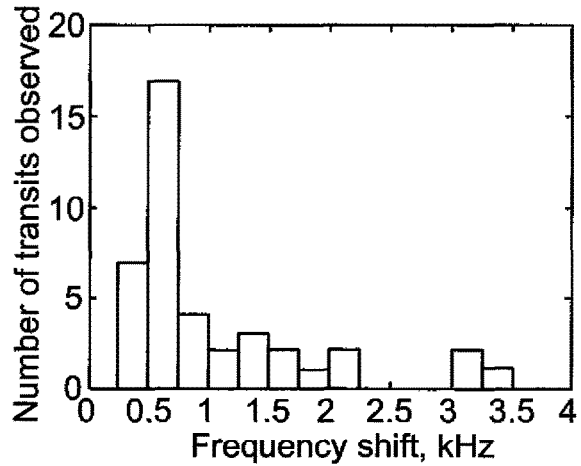

FIGS. 4A-B are graphs of example analysis of transit time and frequency shift statistics. In FIG. 4A, the average particle transit time is presented from multiple observed transits at various flow rates. The error bars represent one standard deviation. The transit time is linearly proportional to the nominal flow rate, as expected. FIG. 4B is a histogram of all measured transits into 250 Hz bins for the 10 µl/min, 15 µl/min, and 50 µl/min flow rates. While most transits cluster in the 0.5-0.75 kHz range, there is deviation since individual particles 102 follow different streamlines within the flow. The particle transit times decrease, FIG. 4A, as the nominal flow rate at the syringe pump is increased.

In one example, observations of 41 transits of the analyte particles are gathered at flow rates of 10 µl/min, 15 µl/min, and 50 µl/min, in FIG. 4B. The mechanical mode frequency shift associated with these transits shows clustering around 0.5-0.75 kHz with significant variation beyond this range. This spread is not explained by the 5% diameter variation in particles that the manufacturer has characterized. The large variations in sensitivity are thus most likely caused because of inadequate control over particle trajectory through the resonator device 106, e.g., particles follow different streamlines in the liquid flow. The sensitivity of the system 100 with respect to particle location is discussed in K. Han, J. Kim, and G. Bahl, Optica 3, 585 (2016), which is incorporated by reference herein. Hydrodynamic focusing, e.g., sheath and core flow, can be implemented which is a standard technique used in flow cytometry. This can provide consistent measurement of particle populations and comparisons between individual particle groups in mixed analytes.

A limit of measurement achieved by the system 100 can be set by both random and systematic frequency fluctuations in the mechanics. Generally, acquiring measurements by averaging over a longer time interval does reduce the effect of rapid fluctuations and improves the noise floor of any measurement system, provided that long-term drift is not significant. On the other hand, longer sample acquisition time can reduce the measurement bandwidth, and therefore an optimization of acquisition interval is included. The optimized averaging time and corresponding sensing limit can be determined by means of Allan deviation analysis, which is a two-sample deviation measurement often used to identify noise sources in an oscillator. Quantification of the Allan deviation of the oscillator frequency measurement as a function of the acquisition period, e.g., averaging time, can serve as a guide to selecting the best averaging time to obtain the best noise floor in our measurements.

Figure 5:
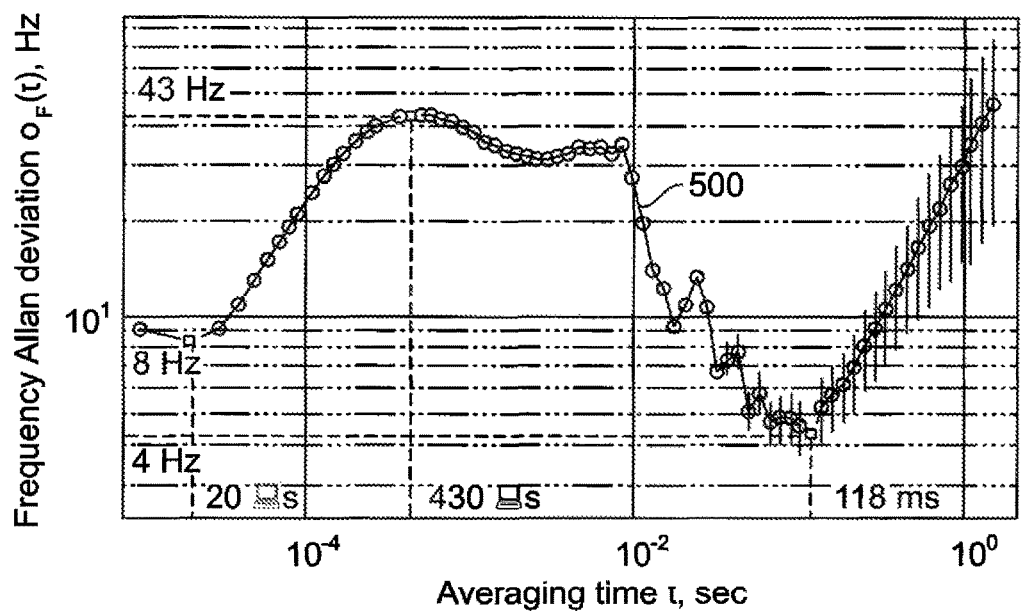
FIG. 5 is a graph of an example quantification of the measurement noise floor.

FIG. 5 is a graph of an example quantification of a measurement noise floor, e.g., by plotting Allan deviations 500 at different frequencies. For example, Allan deviation analysis is performed for frequency fluctuations that are measured with only liquid, e.g., flowing through the resonator device 106. The frequency Allan deviation is indicated for a few determined averaging times that represent time scales in the system 100. The measurements can be taken with environmental protection or feedback stabilization to provide potential further improvement. While the noise may originate from systematic pumping and pressure fluctuations, no significant change of the Allan deviation was measured over all the measured flow rates. This is commensurate with the fact that the motor step rate in the syringe pump does not change more than 6% over this flow range.

Uncertainty can be minimized for averaging time around 120 ms, with long-term drift affecting the measurement for longer averaging times. To measure particle transit times at or below than 400 µs, the system 100 time averaging of the frequency data cannot be used to this extent. In some examples, at fast time scales, a minimum Allan deviation of 8 Hz is measured when using nearly the full bandwidth of this system (τ=20 µs, equaling 50,000 events/s). The Allan deviation quantification can be used to estimate the detection limit of the system 100, by comparison of the noise floor with calibration particle measurements. In some examples, hydrodynamic focusing can be used to focus the particles at the highest sensitivity region of the mechanical mode. In some examples, an observed mechanical frequency shift for the 3.6 µm particle population is $\Delta f_{max}$=3.15 kHz, which is likely obtained by particles transiting a high-sensitivity region of the mechanical mode. Since higher sensitivity particle trajectories may exist, the 3.15 kHz detection can be used as a lower-bound estimate of the highest achievable sensitivity. Using the measured 8 Hz Allan deviation for averaging time of 20 µs, a volume ratio analysis obtains the particle size noise floor as 490 nm. The current system 100 is therefore very close to the regime where single viruses (typically 100 nm) may be detectable.

In some examples, the real-time system for detecting free-flowing nanoparticles in solution operates at a single frequency and cannot characterize the complete mechanical spectrum. Even so, the particle density and compressibility properties can be derived from the simple measurements. The system 100 can be extended for performing multi-frequency measurements of the optomechanical response. Uncertainties arising from vibration, temperature, and pressure may also be mitigated through multi-frequency measurements performed on several mechanical modes simultaneously. Positive feedback can be used to dynamically boost the sensitivity of the system 100 but with a possible sacrifice of measurement bandwidth.

In some examples, the resonators 106 include a transparent silica glass, which allows for simultaneous optical measurements on the individual flowing particles that are typically tagged with fluorescent dyes, e.g., in the manner of flow cytometry. The system 100 provides new capabilities to flow cytometers, however, e.g., through the addition of real-time measurement of the mechanics of individual nanoparticles without binding or tagging. The simultaneous extraction of optical and mechanical responses for single particles can provide new degrees of information that have not previously been accessible.

Many modifications and other embodiments set forth herein can come to mind to one skilled in the art having the benefit of the teachings presented in the foregoing descriptions and the associated drawings. Although specified terms are employed herein, they are used in a generic and descriptive sense only and not for purposes of limitation.

We claim:

1. A system, comprising:
a resonator device including walls forming a channel;
where the walls are shaped to simultaneously confine light in an optical mode and to confine vibration in a mechanical mode;
where the mechanical mode is selected so that vibration in the mechanical mode can couple to the optical mode;
a waveguide coupled with the resonator device for guiding a probe light through the resonator device;
an electro-mechanical actuation mechanism to provide a mechanical drive force to the resonator device, wherein the electro-mechanical actuation mechanism comprises a first electrode and a second electrode for receiving an RF electronic signal from a signal generator, wherein the first electrode is placed on a first side of the resonator device and the second electrode is placed on a second side of the resonator device, wherein at least one of the first electrode and the second electrode is placed in contact with the resonator device;
a photodetector to measure light outputted by the waveguide after passing through the resonator device, the outputted light including a modulated version of the probe light based on passing through the resonator device and interacting with a fluid, or a fluid containing a particle, contained by the channel of the resonator device, the photodetector configured to convert the outputted light to an electronic output signal for sensing properties of particles contained within the channel of the resonator device without requiring labeling or binding of the particle, and with or without requiring direct interaction of the particle with an optical mode of the resonator device; and
one or more lock-in amplifiers to receive the electronic output signal from the photodetector via an amplifier, wherein the one or more lock-in amplifiers is configured to compare the electronic output signal from the photodetector, via the amplifier, the RF electronic signal received from the signal generator, and configured to output an amplitude and phase based on comparing the electronic output signal from the photodetector, via the amplifier, to the RF electronic signal received from the signal generator, wherein the amplifier processes the electronic output signal from the photodetector to mitigate influence of the RF electronic signal.

2. The system of claim 1, where the electro-mechanical actuation mechanism comprises two or more electrodes.

3. The system of claim 2, where the electrodes produce at least one of a dielectrophoretic mechanical drive force and an electrostatic mechanical drive force.

4. The system of claim 2, where the electrodes are in contact with the resonator device.

5. The system of claim 2, where the electrodes comprise a wire geometry.

6. The system of claim 2, where the resonator device is coated with conductive material to operate as one of the electrodes.

7. The system of claim 1, where the electro-mechanical actuation mechanism produces mechanical vibration of a mechanical mode of the resonator device.

8. The system of claim 1, further comprising one or more electrical spectrum analyzers to measure the output signal from the photodetector.

9. The system of claim 1, where the amplitude or phase is used to measure a property of the particles.

10. The system of claim 9, where the property of particles comprises at least one of stiffness, volume, compressibility, speed of sound, mass and density.

11. The system of claim 1, where the amplitude or phase is used to measure a property of the fluid.

12. The system of claim 11, where the property of the fluid comprises at least one of bulk modulus, speed of sound, density, viscosity and non-Newtonian parameters.

13. A method, comprising:
providing a liquid containing a particle in a resonator device;
providing a probe light passing through the resonator device;
simultaneously confining light in an optical mode and confining vibration in a mechanical mode, where the mechanical mode is selected so that vibration in the mechanical mode can couple to the optical mode;
providing a mechanical drive force to the resonator device, wherein the mechanical drive force comprises a first electrode and a second electrode for receiving an RF electronic signal from a signal generator, wherein the first electrode is placed on a first side of the resonator device and the second electrode is placed on a second side of the resonator device, wherein at least one of the first electrode and the second electrode is placed in contact with the resonator device;
measuring a light outputted by the waveguide after passing the probe light through the resonator device, the outputted light including a modulated version of the probe light based on passing through the resonator device and interacting with the fluid containing the particle;
converting the outputted light to an electronic output signal;
sensing, via the electronic output signal, properties of particles contained within the channel of the resonator device without requiring labeling or binding of the particle, and with or without requiring direct interaction of the particle with an optical mode of the resonator device;
receiving, at one or more lock-in amplifiers, the electronic output signal via an amplifier, wherein the amplifier processes the electronic output signal;
comparing, via the one or more lock-in amplifiers, the electronic output signal processed by the amplifier to a generated output signal; and
outputting an amplitude and phase based on comparing the electronic output signal processed by the amplifier to the generated output signal.

14. The system of claim 13, where the amplitude or phase is used to measure a property of the particles.

15. The method of claim 13, further comprising detecting particles based on observable frequency shifts in the received outputted light as modified by passing through the resonator device with the provided mechanical drive force.

* * * * *